US010173867B2

United States Patent
Resch et al.

(10) Patent No.: US 10,173,867 B2
(45) Date of Patent: Jan. 8, 2019

(54) TILTING CAB MECHANISM FOR A CRANE

(71) Applicant: Manitowoc Crane Companies, LLC, Manitowoc, WI (US)

(72) Inventors: Brandon D. Resch, Appleton, WI (US); James M. Gauthier, Green Bay, WI (US); William J. O'Neil, Green Bay, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 741 days.

(21) Appl. No.: 14/613,149

(22) Filed: Feb. 3, 2015

(65) Prior Publication Data
US 2015/0225210 A1    Aug. 13, 2015

Related U.S. Application Data

(60) Provisional application No. 61/937,378, filed on Feb. 7, 2014.

(51) Int. Cl.
*B66C 13/54*     (2006.01)
*B62D 33/063*     (2006.01)

(52) U.S. Cl.
CPC ............ *B66C 13/54* (2013.01); *B62D 33/063* (2013.01)

(58) Field of Classification Search
CPC .... B66C 13/54; B62D 33/063; B62D 33/067; B62D 33/07
(Continued)

(56) References Cited

U.S. PATENT DOCUMENTS 3,185,316 A * 5/1965 Bennett, Sr. ............ B66C 13/54
                                                                     212/196
4,436,169 A * 3/1984 Jennerjohn ............. B66C 13/54
                                                                     180/89.14
(Continued)

FOREIGN PATENT DOCUMENTS

CN           201358129 Y     12/2009
DE          202004011990 U1    1/2006
(Continued)

OTHER PUBLICATIONS

International Search Report and Written Opinion for International Application No. PCT/US2015/014373, dated May 13, 2015 (15 pages).

(Continued)

*Primary Examiner* — Minh Truong
*Assistant Examiner* — Juan J Campos, Jr.
(74) *Attorney, Agent, or Firm* — Ramey & Schwaller, LLP; Craig Buschmann

(57) ABSTRACT

A cab support assembly supports and moves an operator's cab relative to a frame of a construction machine. The cab support assembly includes a cab support coupled to the frame of the construction machine. The operator's cab is mounted to a cab support mounting frame, which in turn is pivotably coupled to the cab support. An actuation device is coupled to the cab support and to the cab support mounting frame. The actuation device includes a first actuation device position in which the cab support frame is in a first position in which the cab support mounting frame defines a first plane, and at least a second actuation device position in which the cab support mounting frame is in a second position such that the cab support mounting frame defines a second plane that intersects the first plane at a negative angle.

23 Claims, 13 Drawing Sheets

(58) Field of Classification Search
USPC .................. 212/291; 180/89.13, 89.14, 89.15
See application file for complete search history.

(56) References Cited

U.S. PATENT DOCUMENTS

| | | | | |
|---|---|---|---|---|
| 8,180,532 B2* | 5/2012 | O'Halloran | ........ | B60G 17/0165 180/89.15 |
| 2003/0217984 A1 | 11/2003 | Lissandre | | |
| 2005/0264038 A1* | 12/2005 | Albright | ............ | B62D 33/0617 296/190.05 |
| 2006/0254095 A1* | 11/2006 | Ishii | ........................ | B62D 33/07 37/411 |
| 2006/0266573 A1* | 11/2006 | Ishii | ................... | B62D 33/0604 180/326 |
| 2008/0265624 A1* | 10/2008 | Takano | .............. | B62D 33/0625 296/190.01 |
| 2010/0102594 A1* | 4/2010 | Kimura | .............. | B60H 1/00378 296/190.01 |
| 2010/0301635 A1* | 12/2010 | Andou | ................. | B62D 33/067 296/190.05 |
| 2011/0017536 A1* | 1/2011 | Chunduru | ............ | B62D 33/067 180/89.14 |
| 2011/0017537 A1* | 1/2011 | Andou | ................. | B60K 15/063 180/89.16 |
| 2014/0103183 A1* | 4/2014 | Lokhande | .............. | B62D 33/07 248/352 |
| 2015/0225210 A1* | 8/2015 | Resch | ................. | B62D 33/063 212/291 |
| 2016/0083022 A1* | 3/2016 | Hellholm | ................ | B66C 13/54 296/190.04 |

FOREIGN PATENT DOCUMENTS

| | | |
|---|---|---|
| EP | 1674619 A2 | 6/2006 |
| EP | 1783283 A1 | 5/2007 |
| EP | 2628375 A1 | 8/2013 |
| JP | 9-249382 A | 9/1997 |
| JP | 10-87275 A | 4/1998 |
| JP | 2003-221841 A | 8/2003 |
| JP | 2002145226 A | 11/2003 |

OTHER PUBLICATIONS

Extended European Search Report dated Nov. 22, 2017, in European Application No. 15746401.7.

* cited by examiner

TILTING CAB MECHANISM FOR A CRANE

REFERENCE TO EARLIER FILED APPLICATIONS

The present application claims priority to and the benefit of U.S. Provisional Patent Application Ser. No. 61/937,378 filed Feb. 7, 2014 and titled Tilting Cab Mechanism For A Crane, the disclosure of which is incorporated in its entirety by this reference.

BACKGROUND

The present application relates to construction equipment and machines, such as cranes, excavators, and the like. In particular, the present application relates to a construction machines that include an operator's cab that can by repositioned for transportation of the construction machine.

Construction equipment, such as cranes or excavators, must often be moved from one job site to another. Moving a crane or an excavator can be a formidable task when the machine is large and heavy. For example, highway limits on vehicle-axle loads must be observed, and overhead obstacles can dictate long, inconvenient routings to the job site.

One solution to improving the mobility of large construction machines, such as cranes, is to disassemble them into smaller, more easily handled components. The separate components can then be transported to the new job site where they are reassembled.

Of course, there is a both a time and cost component to disassembling and reassembling these machines. Thus, it is desirable to limit the number of components that must be disassembled. Instead, it is sometimes sought to provide components that may be repositioned or repackaged from their original position in order to meet any size/height/weight limits on the roads over which the construction machine travels when relocating to a new work site.

One of the components that proves typically cumbersome is the operator's cab for the construction machine. Typically, the operator's cab is positioned in a location from which it can best view the area in which the construction machine is working. For example, it is important for a crane operator to have a relatively unobstructed view to the top, sides, and above and below a rotating bed of the crane. The requirement for such a view typically results in the operator's cab being positioned towards the front of the crane and perhaps offset to one side or the other. In addition, some cranes include operator's cabs and/or operator's seats that have an ability to tilt the front of the operator's cab or seat upward. Tilting the operator's cab or seat upward provides the crane operator with a better view of the crane's boom and/or the hook/load during operations. Upward tilting seats and/or cabs, however, do not improve an operator's visibility in those situations in which the rotating bed is elevated relative to the work area, such as when a crane is lowering something into a hole, such as a building foundation.

Positioning the operator's cab in a location that provides the operator with improved visibility, however, typically causes the rotating bed and operator's cab to be too wide, too heavy, and/or too tall for many highways and regions. In those instances, it would be necessary to remove the operator's cab and ship it separately from the rotating bed. As noted, this increases the time and cost for disassembly and reassembly, not least because of the numerous electronic, hydraulic, and mechanical control systems that are integrated into the operator's cab.

Others have attempted to solve the shipping problem by provided an operator's cab that rotates relative to the rotating bed from an operating position to a stowed position in such a way that the rotating bed and operator's cab are capable of being shipped together in a single load that meets any travel restrictions expected to be encountered. The rotating assembly that operates to rotate the operator's cab, however, typically is capable of only rotating the operator's cab in a single plane. Stated differently, the operator's cab remains in the same horizontal plane in both the operating position and the stowed position. This, in turn, potentially imposes restrictions on the height of the cab, its location, and other packaging requirements in order to still meet the travel restrictions.

In some instances, the height of the operator's cab is still too high relative to the travel restrictions once the operator's cab has been rotated. Prior solutions involve complex, multi-bar and multi-link mechanisms that would raise and lower the entire operator's cab relative to the rotating bed. Because of the requirement that the operator's cab pivot/rotate from an operating position to a stowed position, this mechanism typically could only be positioned on one side of the operator's cab and proximate the pivot. As a consequence, multi-bar and multi-link mechanisms typically are large in weight to support the torque generated by the weight of the cab, as well as being complex to manufacture and maintain.

Therefore, there is a need for a construction machine that includes a cab capable of tilting at least downward as well as preferably upward. In addition, there is a need for the operator's cab to be positionable between an operating position and a stowed position in which the operator's cab and associated vehicle frame and/or rotating bed meets any necessary travel height and width restrictions.

BRIEF SUMMARY

A cab support assembly supports and moves an operator's cab relative to a frame of a construction machine. The cab support assembly includes a cab support coupled to the frame of the construction machine. The operator's cab is mounted to a cab support mounting frame, which in turn is pivotably coupled to the cab support. An actuation device is coupled to the cab support and to the cab support mounting frame. The actuation device includes a first actuation device position in which the cab support frame is in a first position in which the cab support mounting frame defines a first plane, and at least a second actuation device position in which the cab support mounting frame is in a second position such that the cab support mounting frame defines a second plane that intersects the first plane at a negative angle.

In another embodiment, a cab support assembly supports and moves an operator's cab relative to a rotating bed of a crane. The cab support assembly includes a cab support coupled to the rotating bed. The operator's cab is mounted to a cab support mounting frame, which in turn is pivotably coupled to the cab support. An actuation device is coupled to the cab support and to the cab support mounting frame. The actuation device includes a first actuation device position in which the cab support frame is in a first position in which the cab support mounting frame defines a first plane, and at least a second actuation device position in which the cab support mounting frame is in a second position such that the cab support mounting frame defines a second plane that intersects the first plane at a negative angle.

In yet another embodiment, a mobile lift crane includes an operator's cab having an operating position and a stowed position that is rotated and tilted downward relative to the operating position. The mobile lift crane includes a carbody with movable ground engaging members mounted on the carbody that raise the carbody off the ground and allow the crane to move over the ground. A rotating bed is rotatably coupled to the carbody. A cab support, in turn, is pivotably coupled to the rotating bed at a pivotable coupling. The operator's cab is supported by and mounted to a cab support mounting frame, which is pivotably coupled to the cab support. The cab support mounting frame has a rear portion and a front portion spaced apart from the rear portion. An actuation device is coupled to the cab support and to the cab support mounting frame. The actuation device includes a first actuation device position in which the front portion of the cab support mounting frame is in a first position, and at least a second actuation device position in which the front portion is in a second position that is lower than the first position.

In yet another embodiment, a mobile lift crane includes an operator's cab having an operating position and a stowed position that is rotated and tilted downward relative to the operating position. A cab support, in turn, is pivotably coupled to the rotating bed at a pivotable coupling on a rotating bed of the crane. The operator's cab is supported by and mounted to a cab support mounting frame, which is pivotably coupled to the cab support. The cab support is substantially parallel to a front portion of the rotating bed when the cab support is in its operating position and substantially perpendicular to the front portion of the rotating bed when the cab support is in its stowed position. The cab support mounting frame has a rear portion and a front portion spaced apart from the rear portion. An actuation device is coupled to the cab support and to the cab support mounting frame. The actuation device includes a first actuation device position in which the front portion of the cab support mounting frame is in a first position, and at least a second actuation device position in which the front portion is in a second position that is lower than the first position.

In yet another embodiment, a mobile lift crane includes an operator's cab having an operating position and a stowed position that is rotated and tilted downward relative to the operating position. A cab support, in turn, is pivotably coupled to the rotating bed at a pivotable coupling on a rotating bed of the crane. The operator's cab is supported by and mounted to a cab support mounting frame, which is pivotably coupled to the cab support. The cab support mounting frame has a rear portion and a front portion spaced apart from the rear portion. An actuation device is coupled to the cab support and to the cab support mounting frame. The actuation device includes a first actuation device position in which the front portion of the cab support frame is in a first position, and at least a second actuation device position in which the front portion is in a second position that is lower than the first position. The front portion of the cab support mounting frame is in its second position when the cab support is in its stowed position.

In yet another embodiment, a mobile lift crane includes an operator's cab having an operating position and a stowed position that is rotated and tilted downward relative to the operating position. A cab support, in turn, is pivotably coupled to the rotating bed at a pivotable coupling on a rotating bed of the crane. The operator's cab is supported by and mounted to a cab support mounting frame, which is pivotably coupled to the cab support. The cab support mounting frame has a rear portion and a front portion spaced apart from the rear portion. An actuation device is coupled to the cab support and to the cab support mounting frame. The actuation device includes a first actuation device position in which the front portion of the cab support mounting frame is in a first position, a second actuation device position in which the front portion is in a second position that is lower than the first position, and at least a third actuation device position in which the front portion of the cab support mounting frame is in a third position that is higher than the first position.

In yet another embodiment, a mobile lift crane includes an operator's cab having an operating position and a stowed position that is rotated and tilted downward relative to the operating position. A cab support, in turn, is pivotably coupled to the rotating bed at a pivotable coupling on a rotating bed of the crane. The operator's cab is supported by and mounted to a cab support mounting frame, which is pivotably coupled to the cab support. The cab support mounting frame has a rear portion and a front portion spaced apart from the rear portion. An actuation device is coupled to the cab support and to the cab support mounting frame. The actuation device includes a first actuation device position in which the front portion of the cab support mounting frame is in a first position, and at least a second actuation device position in which the front portion is in a second position that is lower than the first position. A locking mechanism that includes a locked position prevents the actuating device from pivoting the cab support mounting frame to the second position and an unlocked position that allows the actuating device to pivot the cab support mounting frame to the second position.

In yet another embodiment, a mobile lift crane includes an operator's cab having an operating position and a stowed position that is rotated and tilted downward relative to the operating position. A cab support, in turn, is pivotably coupled to the rotating bed at a pivotable coupling on a rotating bed of the crane. The operator's cab is supported by and mounted to a cab support mounting frame, which is pivotably coupled to the cab support. The cab support mounting frame has a rear portion and a front portion spaced apart from the rear portion. An actuation device is coupled to the cab support and to the cab support mounting frame. The actuation device includes a first actuation device position in which the front portion of the cab support mounting frame is in a first position, and at least a second actuation device position in which the front portion is in a second position that is lower than the first position. The actuation device includes a first end pivotably connected to the cab support. A second end of the actuation device is spaced apart from the first end and is pivotably connected to the cab support mounting frame. An actuation device mounting bracket is coupled to the cab support mounting frame. The actuation device mounting bracket includes a link connection that is operably coupled to the second end of the actuation device.

In yet another embodiment, a mobile lift crane includes an operator's cab having an operating position and a stowed position that is rotated and tilted downward relative to the operating position. A cab support, in turn, is pivotably coupled to the rotating bed at a pivotable coupling on a rotating bed of the crane. The operator's cab is supported by and mounted to a cab support mounting frame, which is pivotably coupled to the cab support. The cab support mounting frame has a rear portion and a front portion spaced apart from the rear portion. An actuation device is coupled to the cab support and to the cab support mounting frame. The actuation device includes a first actuation device position in which the front portion of the cab support mounting frame is in a first position, a second actuation device position in which the front portion is in a second position that is lower than the first position, and at least a third actuation device position in which the front portion of the cab support mounting frame is in a third position that is higher than the first position. A locking mechanism that includes a locked position prevents the actuating device from pivoting the cab support mounting frame to the second position and an unlocked position that allows the actuating device to pivot the cab support mounting frame to the second position. The actuation device includes a first end pivotably connected to the cab support. A second end of the actuation device is spaced apart from the first end and is pivotably connected to the cab support mounting frame. An actuation device mounting bracket is coupled to the cab support mounting frame. The actuation device mounting bracket includes a bearing surface that defines a bearing plane that is substantially perpendicular to the cab support mounting frame. The actuation device mounting bracket also includes a link connection that is operably coupled to the second end of the actuation device. An actuation device link includes a first end that is pivotably coupled to the second end of the actuation device. The actuation device link also includes a second end that is spaced apart from said first end that is pivotably connected to the link connection. The actuation device urges the actuation device link against the bearing surface when the actuation device is in at least the third position. The second end of the actuation device pivots around the first end of the actuation device link, and the second end of the actuation device link pivots around the link connection when the actuation device moves from the first position to the section position and the locking mechanism is in the locked position.

In yet another embodiment, a mobile lift crane includes an operator's cab having an operating position in which the operator's cab is capable of tilting downward. The mobile lift crane includes a carbody with movable ground engaging members mounted on the carbody that raise the carbody off the ground and allow the crane to move over the ground. A rotating bed is rotatably coupled to the carbody. A cab support, in turn, is pivotably coupled to the rotating bed at a pivotable coupling. The operator's cab is supported by and mounted to a cab support mounting frame, which is pivotably coupled to the cab support. The cab support mounting frame has a rear portion and a front portion spaced apart from the rear portion. An actuation device is coupled to the cab support and to the cab support mounting frame. The actuation device includes a first actuation device position in which the front portion of the cab support mounting frame is in a first position, and at least a second actuation device position in which the front portion is in a second position that is lower than the first position. The mobile lift crane further comprises an elevation structure that couples the cab support to the rotating bed. The elevation structure raises the cab support mounting frame above a top of the rotating bed Methods of positioning an operator's cab are also disclosed. A crane with a rotating bed rotatably is coupled to a carbody of the crane. A cab support is pivotably coupled to the rotating bed at a pivotable coupling. A cab support mounting frame in turn is pivotably coupled to the cab support. The cab support mounting frame has a rear portion and a front portion spaced apart from the rear portion. The operator's cab is mounted to the cab support mounting frame. An actuation device is coupled to the cab support and to the cab support mounting frame. One embodiment of a method of moving an operator's cab of a mobile lift crane from an operating position to a stowed position includes rotating the cab support around an axis defined by the pivotable coupling from the operating position in which the cab support is at least substantially parallel to a front portion of the rotating bed to a stowed position in which the cab support is substantially perpendicular to the front portion of the rotating bed. The method further includes operating the actuation device to lower the front portion of the cab support frame from a first position to a second position that is lower than the first position.

These and other advantages, as well as the invention itself, will become more easily understood in view of the attached drawings and apparent in the details of construction and operation as more fully described and claimed below. Moreover, it should be appreciated that several aspects of the invention can be used with other types of cranes, machines or equipment.

DETAILED DESCRIPTION

Figure 1:
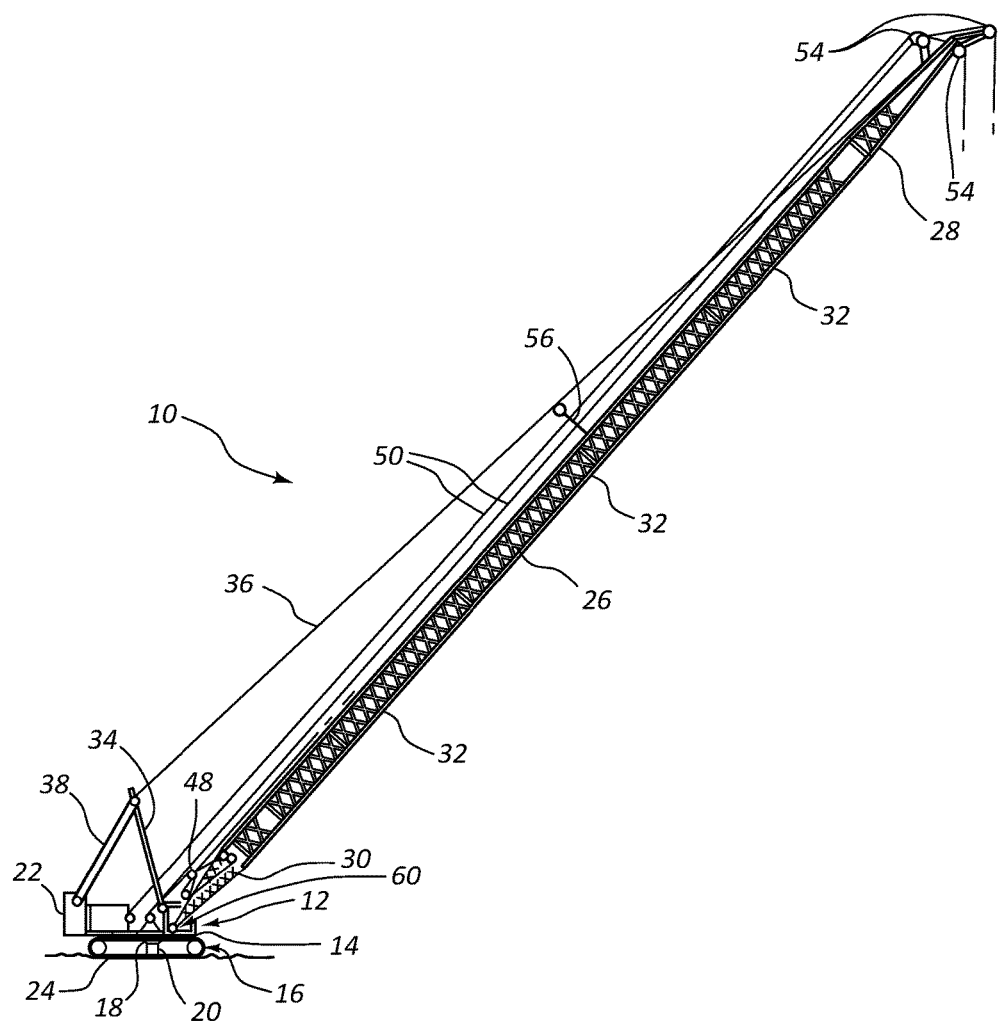
FIG. 1 is a right side elevation view of a mobile lift crane that includes an embodiment of an operator's cab and cab support assembly.

The present invention will now be further described. In the following passages, different aspects of the embodiments of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Several terms used in the specification and claims have a meaning defined as follows.

The term "rotating bed" refers to a portion of the upperworks of the crane (the part that rotates with respect to the carbody), but does not include the boom or any lattice mast structure. The rotating bed may be made up of multiple parts. For example, for purposes of the present invention, the adapter plate disclosed in U.S. Pat. No. 5,176,267 would be considered to be part of the rotating bed of the crane on which it is used. Also, if a crane is taken apart for transportation between job sites, the rotating bed, as that term is used herein, may be transported in more than one piece.

The front of the rotating bed is defined as the portion of the rotating bed that is between the axis of rotation of the rotating bed and the position of the load when a load is being lifted. The rear of the rotating bed includes everything opposite the axis of rotation from the front of the rotating bed. The terms "front" and "rear" (or modifications thereof such as "rearward") referring to other parts of the rotating bed, or things connected thereto, such as the mast, are taken from this same context, regardless of the actual position of the rotating bed with respect to the ground engaging members.

Likewise, the front or front portion and rear or rear portion of the operator's cab and the cab support mounting frame are defined when the operator's cab is in the operating position. The terms "front" and "rear" (or modifications thereof such as "rearward") referring to other parts of the operator's cab and/or the cab support mounting frame, or things connected thereto, are taken from this same context, regardless of the actual position of the operator's cab and/or the cab support mounting frame with respect to the ground engaging members and the rotating bed.

The moveable ground engaging members are defined as members that are designed to remain engaged with the ground while the crane moves over the ground, such as tires or crawlers, but does not include ground engaging members that are designed to be stationary with respect to the ground, or be lifted from contact with the ground when they are moved, such as a ring on a ring supported crane and outriggers commonly found on truck mounted cranes.

Embodiments of the present invention find application in all types of construction machines, such as cranes, excavators, backhoes, and the like. For convenience, the following descriptions relate to mobile lift cranes, but the described operator's cab can be used on other types of construction machines.

Figure 2:
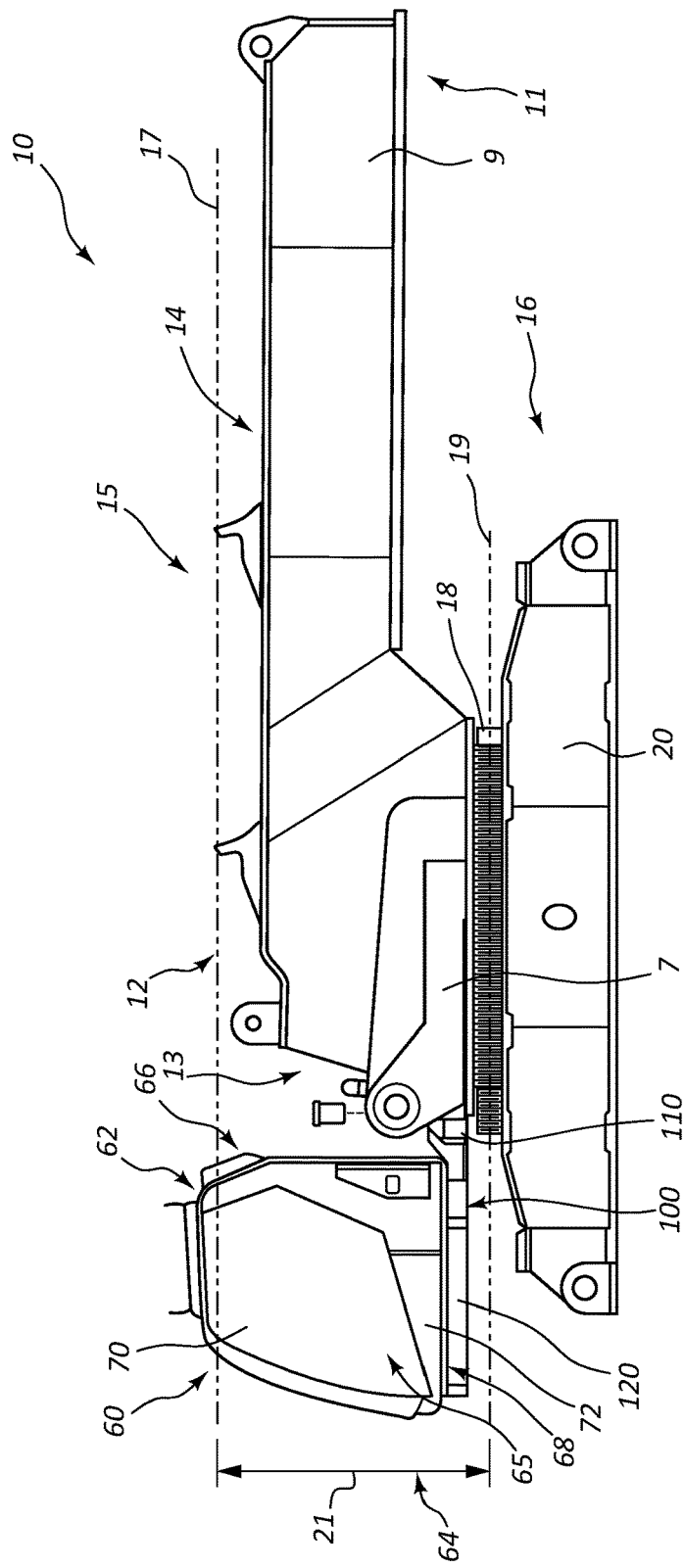
FIG. 2 is a left side elevation view of the rotating bed of the crane of FIG. 1 with several elements removed for clarity.

FIGS. 1 and 2 illustrate a mobile lift crane 10 of the crawler or tracked variety. The crawler crane 10 includes an upper works 12 having a rotating bed 14 that is rotatably connected to a lower works 16 by a swing bearing 18. (Of course, one might consider FIG. 2 to illustrate a construction machine 10 with a frame 14 that supports various components.)

Typically, the upper works 12 and rotating bed 14 are separable at the swing bearing 18 from the lower works 16, as best illustrated in FIG. 2. In some embodiments, the upper works 12 and rotating bed 14 are separable from the lower works 16 at an adapter plate 7, which includes an upper portion that remains with the rotating bed 14 and a lower portion that remains with the lower works 16. Regardless of the exact method and structure by which the crane 10 separates, the relevant point is that the ability to separate the crane 10 allows the upper works 12 and the lower works 16 to be shipped separately as individual loads on separate lowboy trailers, for example. This separation occurs, for representative purposes, along the plane 19. As one of skill in the art will understand, the exact location of plane 19 is a function of the structure and method by which the crane 10 separates.

Returning to FIG. 1, the lower works 16 includes a car body 20, optional counterweights associated with the counterweight assembly 22, and ground engaging members 24. Illustrated in FIG. 1 are crawlers, although the term ground engaging members encompasses things such as tires, for example. In addition, while only one ground engaging member 24 is visible, an identical ground engaging member 24 exists on the other side of crane 10. Further, the disclosure is not limited to only two ground engaging members 24. Rather, crane 10 may employ a plurality of ground engaging members, such as 3, 4, or more.

The upper works 12 includes a boom 26 pivotally connected to the rotating bed 14. The boom 26 comprises a boom top 28 and a tapered boom butt 30. The boom 26 may also include one or more boom inserts 32 connected between the boom top 28 and the boom butt 30 to increase the overall length of the boom 26. While FIG. 1 illustrates a lattice style boom 26, other known types of booms, such as round, oval, and/or telescoping type booms fall within the scope of the disclosure. An optional mast 34 is pivotally connected to the rotating bed 14. The boom 26 is connected to the mast 34 by one or more boom pendants 36.

The angle of the boom 26 is controlled by boom hoist rigging 38 connected between the upper works 12 and the mast 34. While not illustrated, the-boom hoist rigging 38 comprises a boom hoist rope that passes (reeved) around a sheave assembly on the upper end of the mast and a sheave assembly on the rear end of the rotating bed 14. One end of the boom hoist rope is typically anchored to the rotating bed 14, while the other end is anchored to and wrapped around the boom hoist drum.

The optional mast 34 supports the connection between the boom hoist rigging 38 and the boom pendants 36 at a location that is distanced from the axis of the boom 26 to optimize the forces in the boom pendants 36 and the boom hoist rigging 38. This arrangement also permits the boom hoist rigging 38 to impart a force having a component that is perpendicular to the axis of the boom 26. This force is transferred to the end of the boom 26 by the boom pendants 36. Because the weight of the boom 26 is significantly greater than the weight of the mast 34 and the boom hoist rigging 38, the boom hoist rope and the boom pendants 36 are always in tension as long as the boom 26 is within the normal operating range of the crane 10. Conversely, the mast 34 is always in compression as long as the boom 26 is within the normal operating range of the crane 10. A boom backstop 48 is provided to prevent the boom 26 from exceeding a safe operating position and/or angle.

Rotation of the boom hoist drum in one direction (e.g., clockwise) will retract the boom hoist rope, thereby shortening the length of the boom hoist rigging 38 and causing the upper end of the mast 34 to be pulled towards the rear of the rotating body. This in turn raises the end of the boom 26 (i.e., increases the boom angle). Likewise, rotation of the boom hoist drum in the opposite direction (e.g., counter-clockwise) will payout the boom hoist rope, thereby increasing the length of the boom hoist rigging 38 and allowing the upper end of the mast 34 to be pulled away from rear of the rotating bed 14 by the weight of the boom 26. This action results in the lowering of the end of the boom 26 (i.e., decreases the boom angle).

The upper works 12 further includes one or more load hoist lines 50 for lifting loads. Each load hoist line 50 is passed (reeved) around a load hoist line drum (not illustrated) supported on the rotating bed 14 of the upper works 12. The load hoist line drums are rotated to either payout or retrieve the load hoist lines 50. The load hoist lines 50 are reeved around a plurality of boom top sheaves 54 located at the upper end of the boom top 28. The boom may also include one or more wire rope guides 56 attached to upper surface of the boom 26 to prevent the load hoist lines 50 from interfering with the lattice structure of the boom 26. A hook block (not shown) is typically attached to each load hoist line 50.

While not illustrated, as is known the rotating bed 14 or the upper works 12 further includes a power plant, such as a diesel engine, and typically a counterweight(s) or counterweight assembly 22. The power plant supplies power for the various mechanical and hydraulic operations of the crane 10, including movement of the ground engaging members 24, rotation of the rotating bed 14, rotation of the load hoist line drums, and rotation of the boom hoist drum. Operation of the various functions of the crane 10 is controlled from the operator's cab 60.

FIG. 2 illustrates a rotating bed 14, carbody 20, and operator's cab 60, but omits the boom, ground engaging members, and other features for clarity. The rotating bed 14 includes two side portions 9 (only one side is illustrated in FIG. 2), a rear portion 11, a front portion 13 and a top portion 15.

The operator's cab, or simply cab, 60, includes a top portion 62, a front portion 64, side portion 65 (one on each side, although only one is visible in FIG. 2), rear portion 66, and bottom portion 68. The cab 60 typically includes a plurality of windows 70 of safety glass, Plexiglas, or other similar material, positioned about one or more of the top portion 62, front portion 64, side portion 65, and rear portion 66. A door 72 provides ingress and egress for the operator. While the door 72 is illustrated on the left side of the cab 60, it could be positioned on the right side of the cab 60 as an alternative, or an additional door could be positioned on the right side of the cab 60.

As one of skill would recognize, while the cab 60 and the cab support 110 are illustrated as being coupled to the rotating bed proximate the front, left portion of the rotating bed, each can be positioned elsewhere around the rotating bed, such as proximate the front, right side, directly on the sides 9, or elsewhere about the rotating bed 14.

The operator's cab 60 is supported by a cab support assembly 100. The cab support assembly 100, which is discussed in greater detail below, includes a cab support 110 and a cab support mounting frame 120.

The top or top portion 15 of the rotating bed 14 generally defines a plane 17. The distance between the plane 17 and the plane 19 is, effectively, the height 21 of the rotating bed 14 for transportation purposes. Provided this height 21 is less than the height restriction for loads traveling over the highway, there would typically be no issue transporting the rotating bed 14 as a single load (provided other restrictions, such as weight limits, are met).

An issue may arise, however, should a portion of the rotating bed 14 extend above the plane 17 when the rotating bed is configured and packaged for transportation if doing so causes the total height of the rotating bed 14 to exceed the height restriction limits. For example, in FIG. 2 a top portion 62 of the cab 60 extends above the plane 17 of the rotating bed. Should the distance the top portion 62 extends above the plane 17 cause the rotating bed 14 to exceed the height restrictions for highway or road travel, the cab 60 would have to be disassembled from the rotating bed 14 prior to shipment, and possibly ship separately from the rotating bed 14. This is less than ideal for the reasons discussed above in the background.

Figure 3:
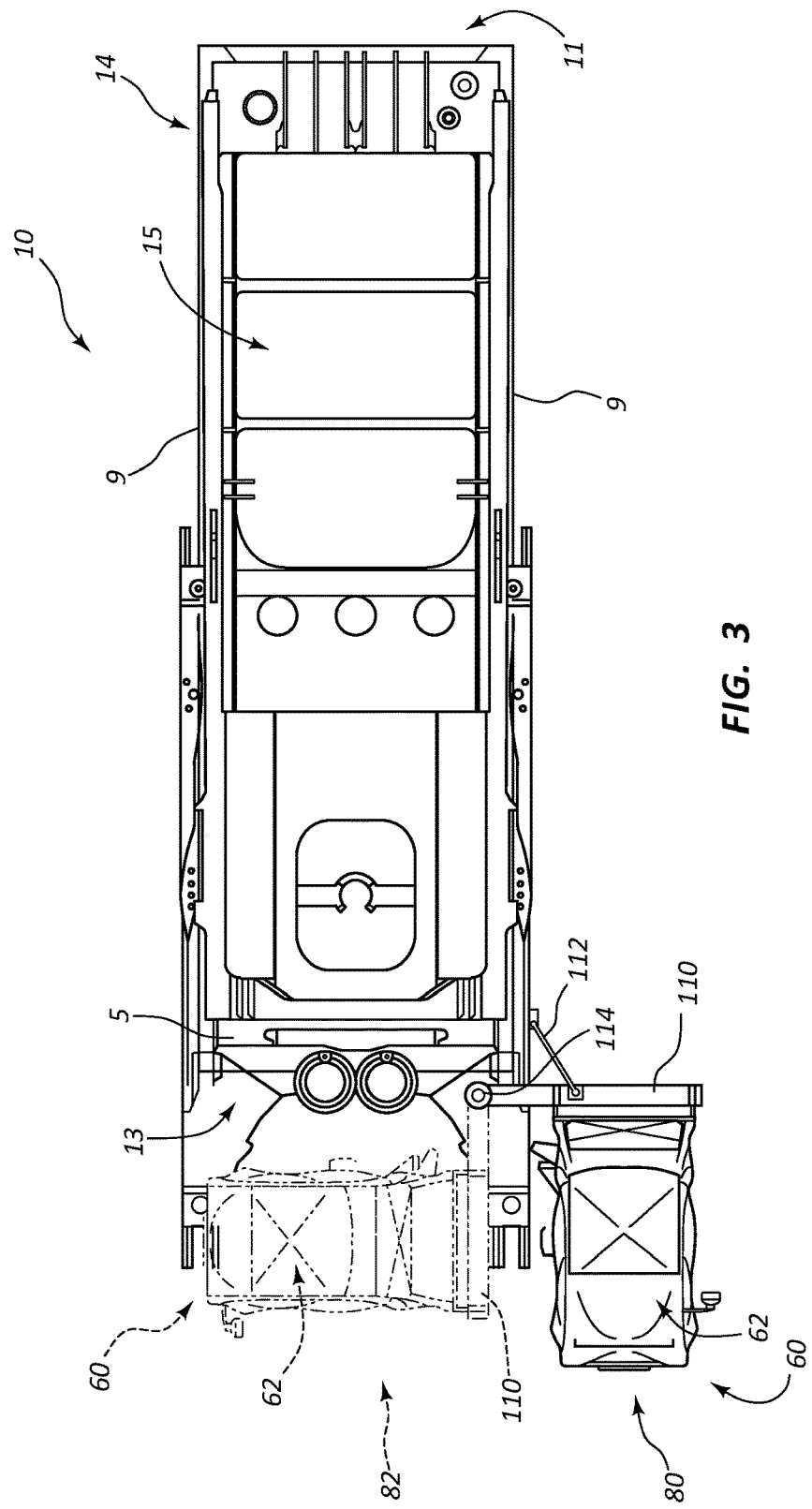
FIG. 3 is a top elevation view of the rotating bed of FIG. 2 with the operator's cab shown in the operating position with solid lines and the stowed position with dashed-lines with several other elements removed for clarity.
Figure 4:
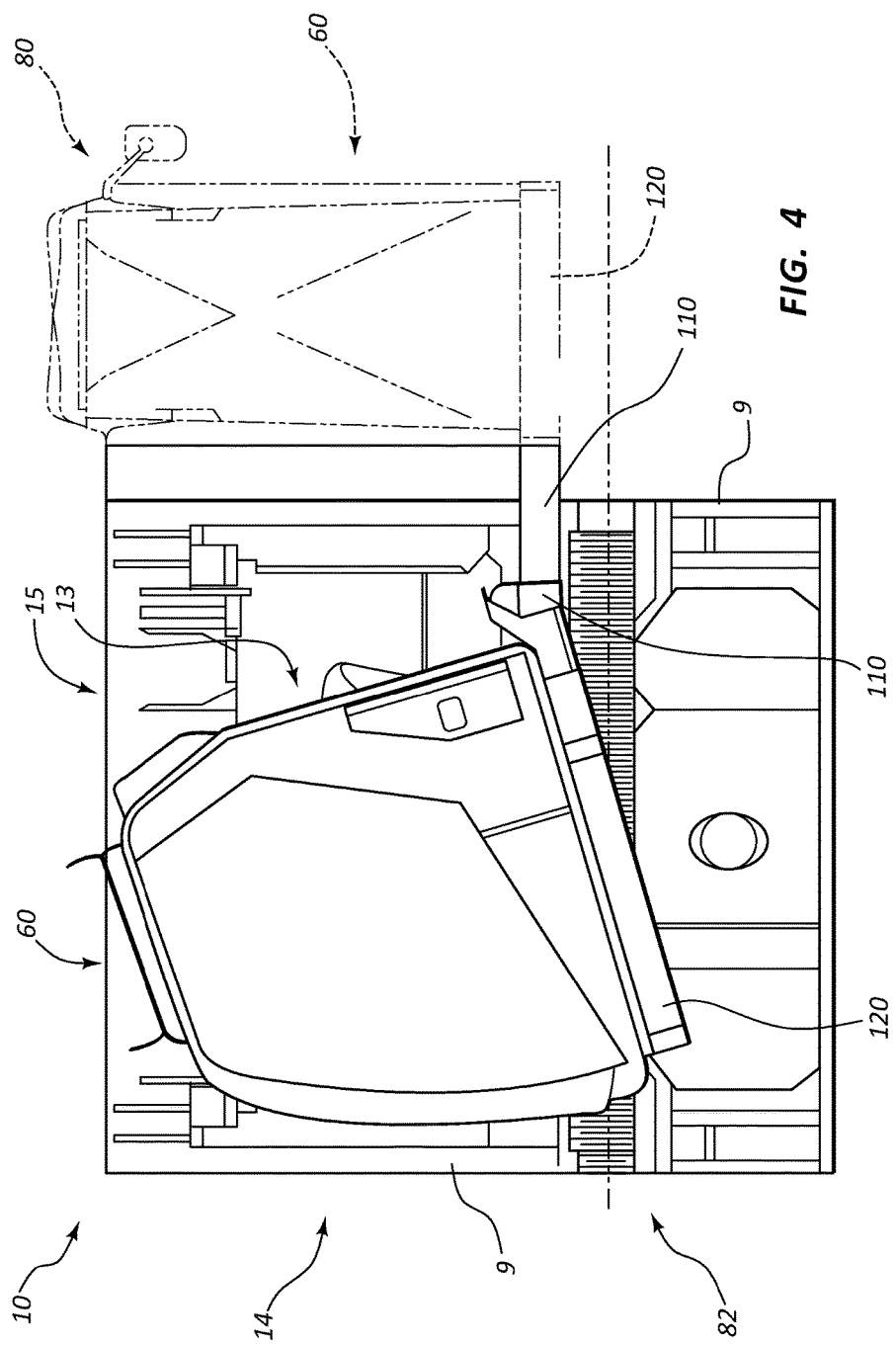
FIG. 4 is a front elevation view of the rotating bed of FIG. 2 with the operator's cab shown in the operating position with dashed-lines and the stowed position with solid lines with several other elements removed for clarity.

FIG. 3 illustrates a top plan view of the rotating bed 14 of the crane 10, while FIG. 4 illustrates a front plan view of the rotating bed 14. The operator's cab 60 is illustrated in an operating position 80 in which the cab support 110 is substantially parallel to the front portion 13 of the rotating bed 14. By substantially parallel it is meant that the cab support 110 is within ±5 degrees of parallel of a cross-member 5 of the rotating bed 14 that couples the sides 9 together. In FIG. 4, the cab support mounting member 120, shown in dashed-lines in this view, would be coming out of the page when the cab 60 is in the operating position 80.

Optionally, a locking member 112 couples the cab support 110 to the rotating bed 14 at, for example, a first point 113 and a second point 115 on the side 9 (FIGS. 6 and 11), although it may do so at other locations on the rotating bed 14. The locking member 112 may be an adjustable threaded rod, a hydraulic cylinder, a steel beam, or any other structure that is configured to couple and decouple from each of the cab support 110 and the rotating bed 14. The purpose of the locking member 112 is to ensure that the cab 60 does not rotate from its operating position 80 and its stowed position 82 at an undesired time or situation.

The operator's cab 60 is capable of rotating about a rotatable or pivotable coupling 112 that couples the cab support 60 to the rotating bed or frame 14. The cab 60 rotates from the operating position 80 to the stowed position 82. In the stowed position 82, the cab support 110 is substantially perpendicular to the front portion 13 of the rotating bed 14. (In FIG. 4, the cab support 110 would be coming out of the page when the cab is in the stowed position 82.) By substantially perpendicular it is meant that the cab support 110 is within ±5 degrees perpendicular of the cross-member 5 of the rotating bed 14.

As will be discussed in greater detail below, the cab 60 optionally is tilted downward when the cab 60 is in its stowed position 82 as compared to the position of the cab 60 in its operating position 80.

Figure 5:
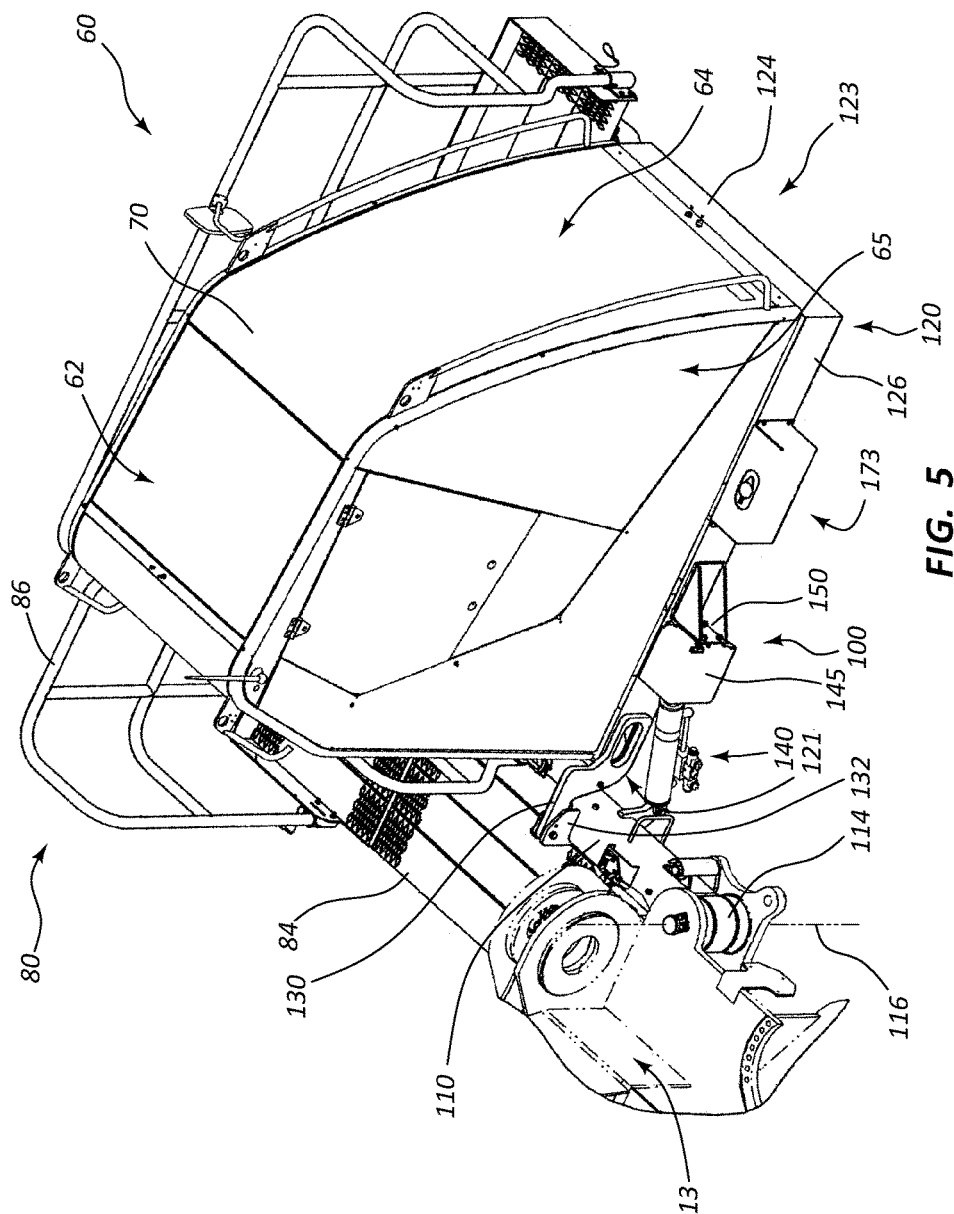
FIG. 5 is a top perspective view of the operator's cab of FIG. 2 with the operator's cab shown in the operating position with several other elements removed for clarity.

Embodiments of the cab support assembly 100 will now be described with respect to FIGS. 5-13 and using element numbers as previously defined. FIG. 5 illustrates a top perspective view in which the cab 60 is in the operating position 80. The cab 60 includes a walkway 84 coupled to the cab 60 that provides a route for an operator to access the door 72 of the cab 60. The walkway 84 is at least partly surrounded by a railing 86 that is coupled to the walkway 84.

As previously noted, the cab support assembly 100 includes a cab support 110 that is coupled to the frame or rotating bed 14 of the crane/construction machine 10 at a pivotable coupling 114. The pivotable coupling 114 defines an axis 116 around which the cab support 110 and the cab 60 rotate from an operating position 80 to at least a stowed position 82.

The cab support assembly 100 also includes the cab support mounting frame 120 upon which the operator's cab 60 is mounted. The cab support mounting frame 120 includes at least a rear portion 121 with at least a rear member 122 (FIGS. 7 and 9), and a front portion 123 spaced apart from the rear portion 121. The rear portion 121 and, more particularly, the rear member 122, is pivotably coupled to the cab support 110. A bracket 130 attached to rear member 122 couples with another bracket 132 attached to the cab support 110 and provides the pivotal connection between the cab support 110 and the cab support mounting frame 120.

The cab support mounting frame 120 also includes a front member 124 spaced apart from the rear member 122, and a plurality of sides members, such as first side member 126, and a second side member 128 spaced apart from the first side member 126. The first side member 126 and the second side member 128 connect the rear member 122 with the front member 124.

Figure 6:
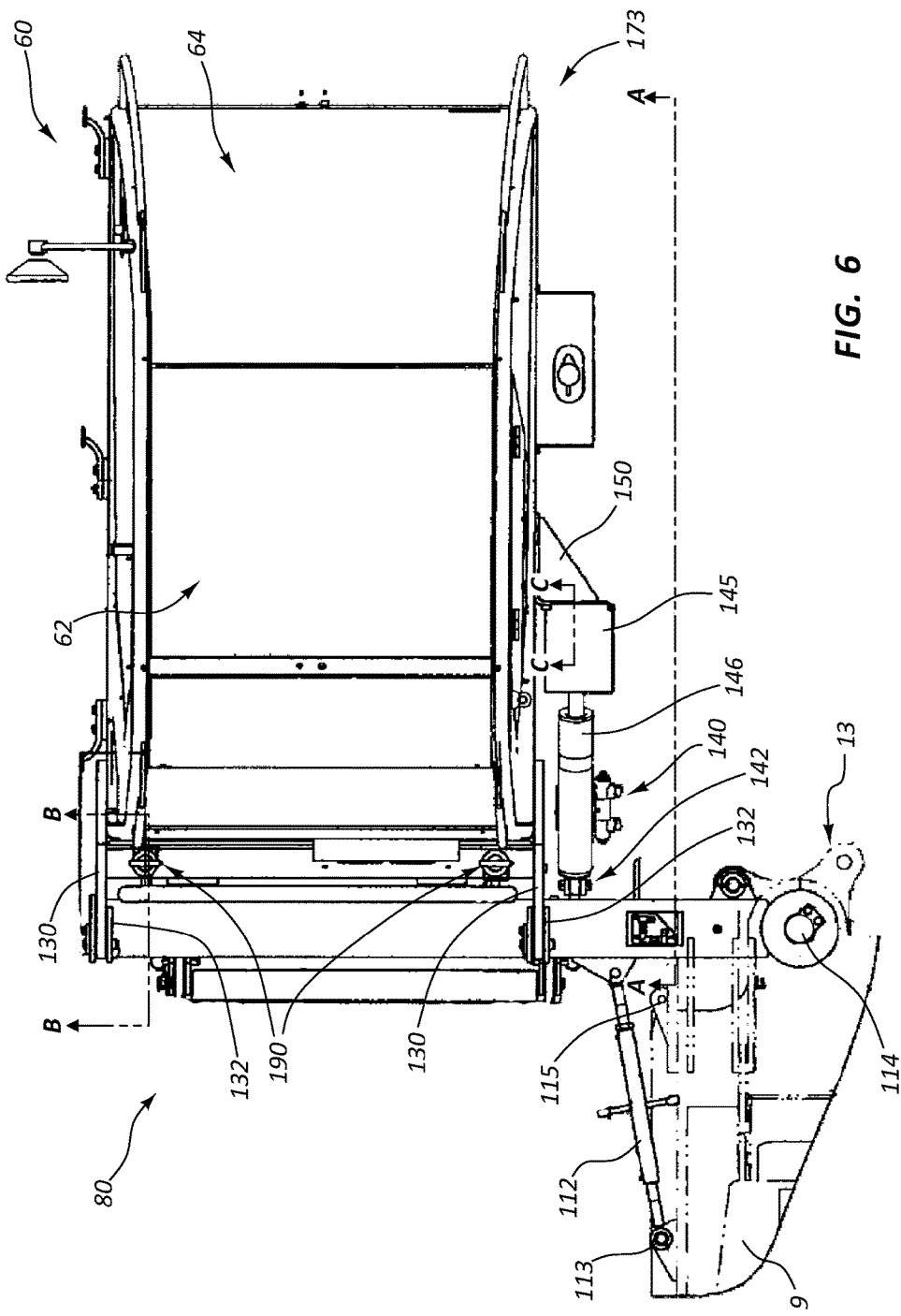
FIG. 6 is a top elevation view of the operator's cab of FIG. 2 with the operator's cab shown in the operating position with several other elements removed for clarity.
Figure 7:
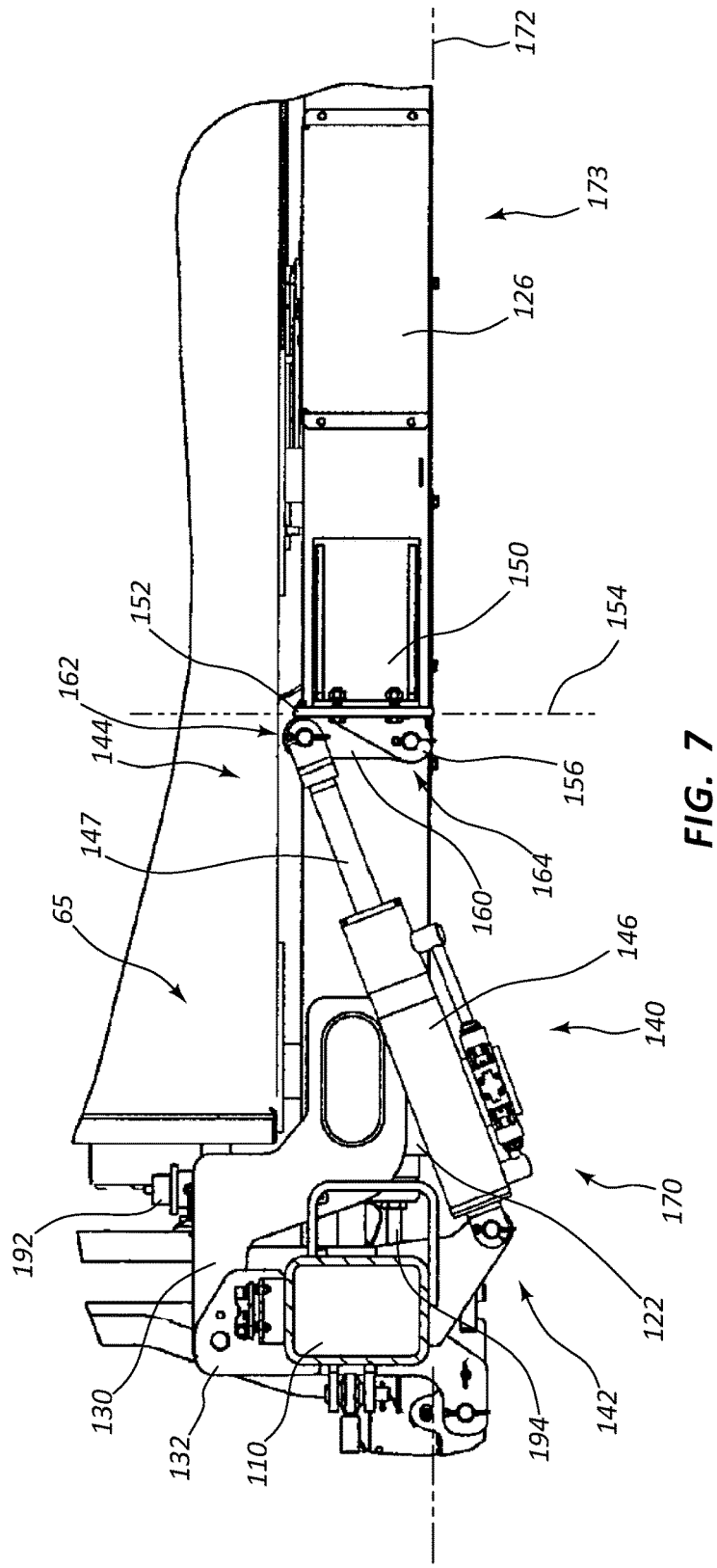
FIG. 7 is a side elevation view of the cross-section A-A of the cab support assembly of FIG. 6.
Figure 8:
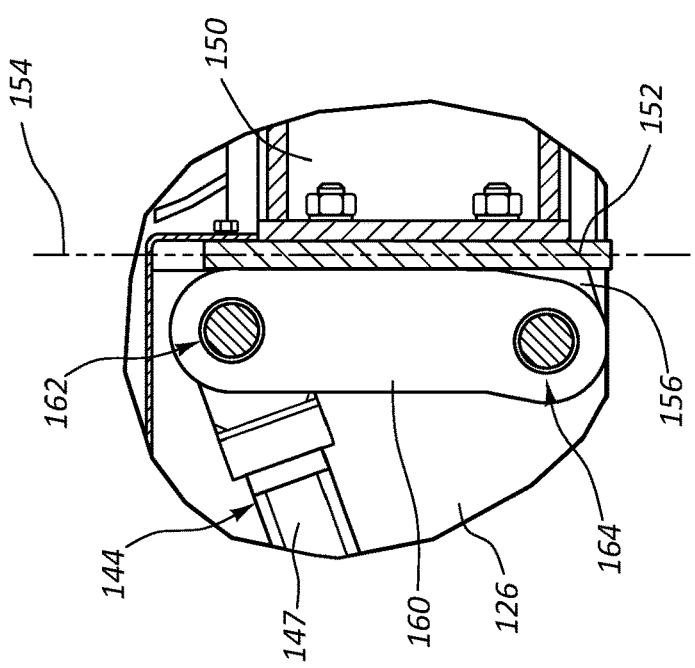
FIG. 8 is a side elevation view of the cross-section C-C of the actuation device link and actuation device mounting bracket of FIG. 6.

The cab support assembly 100 also includes an actuation device 140 that includes a first end 142 and a second end 144 spaced apart from the first end 142. In FIGS. 5 and 6, a protective cover 145 covers the second end 144 (and, therefore, second end 144 is not illustrated in FIGS. 5 and 6), while FIGS. 7 and 8 show the second end 144 without the cover 145 concealing the second end 144. The actuation device 140 preferably is a hydraulic cylinder 146 with a rod 147, although other devices capable of providing linear movement, such as drive screws and the like, can be used as an actuation device 140. While the rod 147 is illustrated as being at the second end 144 of the actuation device 140, the hydraulic cylinder 146 is capable of being oriented in the opposite direction such that the rod 147 is located at what is indicated as the first end 142 of the actuation device 140.

The first end 142 of the actuation device 140 is pivotably coupled to the cab support 110, while the second end 142 is pivotably coupled to the cab support mounting frame 120. In the embodiment illustrated, the second end 144 is pivotably coupled to the side member 126 of the cab support mounting frame 120, although it could be coupled to any of the members of the cab support mounting frame 120.

As best illustrated in FIGS. 7 and 8, the cab support assembly 100 also includes an actuation device mounting bracket 150 that is coupled to the cab support mounting frame 120 through welding, bolting, rivets, screws, and other methods of attachment. The actuation device mounting bracket 150 includes a bearing surface 152 that defines a bearing plane 154.

The actuation device mounting bracket 150 also includes a link connection 156 operably coupled to the second end 144 of the actuation device 140. More specifically, a first end 162 of an actuation device link 160 is pivotably coupled to the second end 144 of the actuation device 140. Likewise, a second end 164 spaced apart from the first end 162 of the actuation device link 160 is pivotably coupled to the link connection 156 of the actuation device mounting bracket 150.

With the structure identified, an example of the cab support assembly in use is discussed. The actuation device 140 includes a first actuation device position 170 (FIG. 7) in which the cab support mounting frame 120 is in a first position 173 that defines a first plane 172. As illustrated, the first plane 172 (FIGS. 7, 10, and 13) is one that would be substantially parallel to the ground when the crane 10 is on a level surface, although the plane 172 need not be parallel to level ground. In addition, the actuation device 140 includes at least a second actuation device position 174 (FIG. 10, for example) in which the cab support mounting frame 120 is in a second position 175 that defines a second plane 176 that intersects the first plane 172 at a negative angle 178.

As will be appreciated, the first plane 172 and the second plane 176 identify the relative position of the two planes. Thus, the first plane 172 and the second plane 176 are not limited to being a first plane 172 fixed at zero degrees (i.e., parallel to the ground when the crane 10 is on a level surface) and a second plane 176 at a fixed negative angle 178. Rather, the negative angle 178 falls within a range from zero (exclusive) to negative thirty (−30) degrees (inclusive) and, more preferably, from zero (exclusive) to negative twenty (−20) degrees (inclusive).

As noted above, it may be of benefit to provide a cab that tilts upward so that the operator has a better view of the boom and the hook/load. Therefore, the actuation device 140 optionally includes at least a third actuation device position 180 (FIG. 13) in which the cab support mounting frame 120 is in a third position 177 that defines a third plane 182 that intersects the first plane 172 at a positive angle 184. As with the first plane 172 and the second plane 176, the third plane 182 is not limited to be a single, fixed positive angle 184. Rather, the positive angle 184 falls within a range from zero (exclusive) to positive thirty (+30) degrees (inclusive) and, more preferably, from zero (exclusive) to positive twenty (+20) degrees (inclusive).

An example of using the actuation device 140 helps to illustrate the above embodiments. The actuation device 140 in the form of a hydraulic cylinder 146 has a first position 170. An operator wishes to tilt the front portion 123 of the cab support mounting frame 120 downwards. The operator or a control system would activate the hydraulic cylinder 146 to retract the rod 147 so that the hydraulic cylinder is in a second position 174. Adjusting the position of the hydraulic cylinder 146 in this manner draws the cab support mounting frame 120 towards the first end 142 of the hydraulic cylinder 146. As noted above, the rear portion 121 of the cab support mounting frame 120 is pivotally connected to the cab support 110. As a consequence, the cab support mounting frame 120 pivots downward so that the front portion 123 of the cab support mounting frame 120 is relatively lower when the actuation device 140 or hydraulic cylinder 146 is in the second position 174 than the position of the front portion 123 when the actuation device 140/hydraulic cylinder 146 is in the first position 170.

Likewise, should an operator wish to tilt the front portion 123 of the cab support mounting frame 120 upwards the operator or a control system would activate the hydraulic cylinder 146 to extend the rod 147 so that the hydraulic cylinder is in a third position 180. Adjusting the position of the hydraulic cylinder 146 in this manner urges the cab support mounting frame 120 away from the first end 142 of the hydraulic cylinder 146. Consequently, the cab support mounting frame 120 pivots upwards so that the front portion 123 of the cab support mounting frame 120 is relatively higher when the actuation device 140 or hydraulic cylinder 146 is in the third position 180 than the position of the front portion 123 when the actuation device 140/hydraulic cylinder 146 is in the first position 170.

Figure 9:
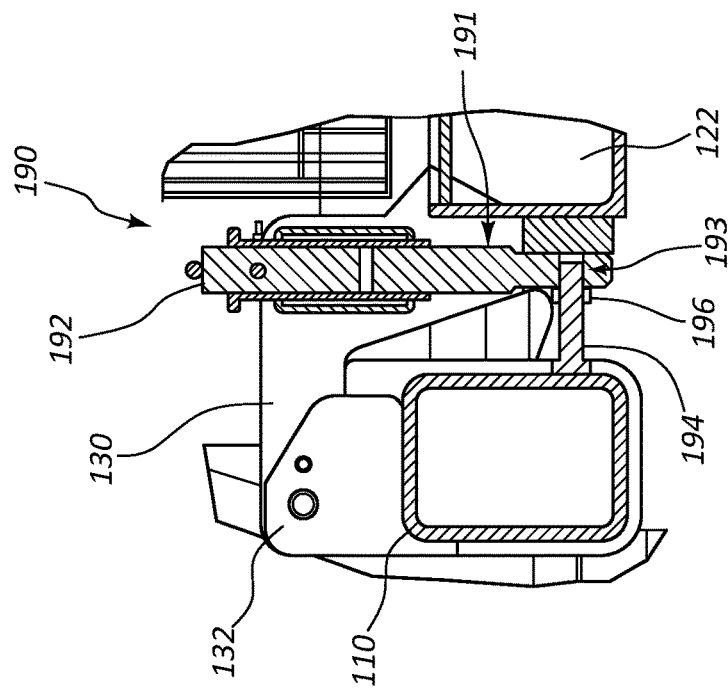
FIG. 9 is a side elevation view of the cross-section B-B of the locking mechanism of FIG. 6.

Optionally, the cab support assembly 100 includes a locking mechanism 190 that includes a locked position 191 that prevents the cab support mounting frame 120 from pivoting downward, as best illustrated in the cross-section of FIG. 9. In other words, the locking mechanism 190 prevents the cab support mounting frame 120 from unintentionally pivoting downward at an undesired time or location, such as in the event of a mechanical failure. While the locking mechanism 190 in this embodiment prevents downward rotation of the cab support mounting frame 120, in other embodiments the locking mechanism alternatively or additionally prevents upward rotation of the cab support mounting frame 120.

Of course, the locking mechanism 190 also includes an unlocked position 197 (FIG. 10) that allows the actuating device 140 to pivot or move to its second position 174, which in turn allows the cab support mounting frame 120 to tilt downward.

The locking mechanism, in various embodiments, may simply be a pin inserted into a hole, latches, straps, and other types of locking mechanisms. An embodiment of the locking mechanism 190 includes a pin 192 with a hole 193 that interacts with a threaded bolt 194 and nut 196. As noted, FIG. 9 illustrates the locking mechanism 190 in its locked position 191. In order to move the locking mechanism 190 to its unlocked position 197 (FIG. 10), the pin 192 is raised and rotated 90 degrees, which orients the threaded bolt 194 and nut 196 in such a way as to allow the cab support mounting frame 120 to pivot downward about the cab support 110 when the actuation device 140 is actuated.

It will be appreciated, however, that it might be possible for an operator to actuate the actuation device 140 without having first removed the locking mechanism 190 or otherwise moving the locking mechanism 190 to its unlocked position 197. For example, an operator who intentionally attempts to actuate the actuation device 140 so that it moves from its first position 170 to its second position 174, the locking mechanism 190 would physically prevent the cab support frame 120 from moving. In that event, and depending on the force that the actuation device 140 is capable of generating, the actuation device 140 risks causing damage to itself, the locking mechanism 190, and/or the cab support mounting frame 120, for example.

To avoid such a situation, the various components might be made larger and/or of stronger materials to better resist any possible harm. Of course, the drawback to such an approach is that it increases weight and may affect the packaging and positioning of other nearby components.

Instead, and referring to FIGS. 7 and 8, a particular design feature of the actuation device mounting bracket 150 and the actuation device link 160 provides an innovative solution to this problem. Should the locking mechanism 190 be in the unlocked position 197 when the actuation device 140 is moved from its first position 170 to its second position 174, the force of gravity alone and/or in combination with the force of the actuation device 140 causes the cab support mounting frame 120 to tilt downward, as discussed above. The first end 162 of the actuation device link 160 may or may not pivot at least partly around the connection between the second end 164 and the link connection 156.

If, on the other hand, the locking mechanism 190 is in its locked position 191, thus preventing the cab support frame 120 from tilting downward, the first end 162 of the actuation device link 160 certainly will pivot around the connection between the second end 164 and the link connection 156. The pivoting action of the actuation device link 160 permits the actuation device 140 to move from the first position 170 to the second position 174 without risk of harm to any of the various components. Of course, in this instance the locking mechanism 190 keeps the cab supporting mounting frame 120 in its operating position/first position that corresponds with the plane 172.

Of course, using the movable actuation device link 160, should it be able to pivot freely, would limit the ability of the actuation device 140 to efficiently move from its first position 170 to its third position 180 in order to raise the front portion 123 of the cab support mounting frame 120. Thus, and as noted above, the actuation device mounting bracket 150 includes the bearing surface 152 that defines a bearing plane 154. The bearing plane 154 can be in any particular orientation, although the embodiment illustrated shows that the bearing plane 154 is substantially (i.e., ±5 degrees) perpendicular to the first plane 172 when the cab support mounting frame 120 and the actuation device 140 are in its first position 170.

Actuating the actuation device 140 from its first position 170 to its third position 180 causes the second end 144 of the actuation device 140 to urge the actuation device link 160 against the bearing surface 152. In this way, the force generated by the actuation device 140 acts in a direction along the actuation device 140, which provides a significant component force perpendicular to the bearing surface 152.

Figure 15:
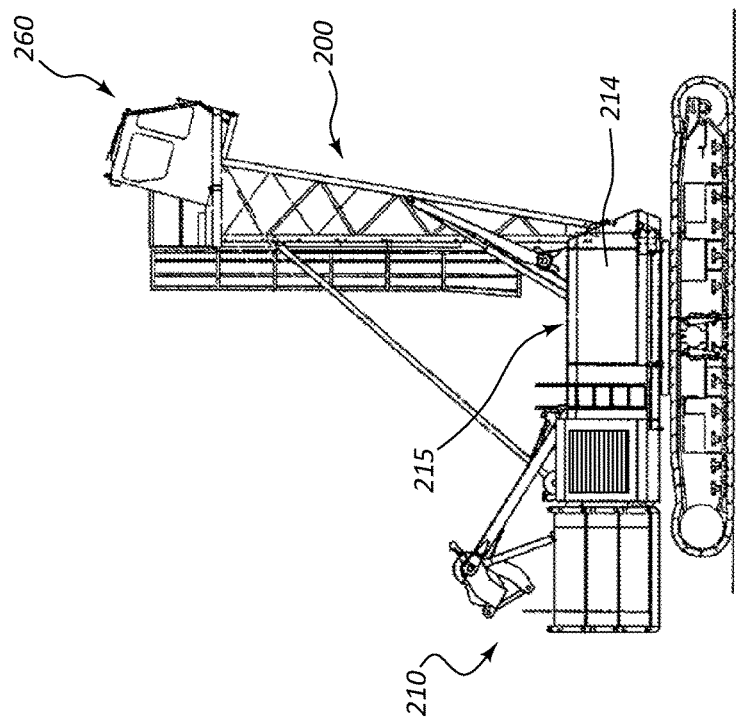
FIG. 15 is a right side elevation view of the lift crane of FIG. 14 in which the operator's cab and cab support assembly is tilted downward.
Figure 14:
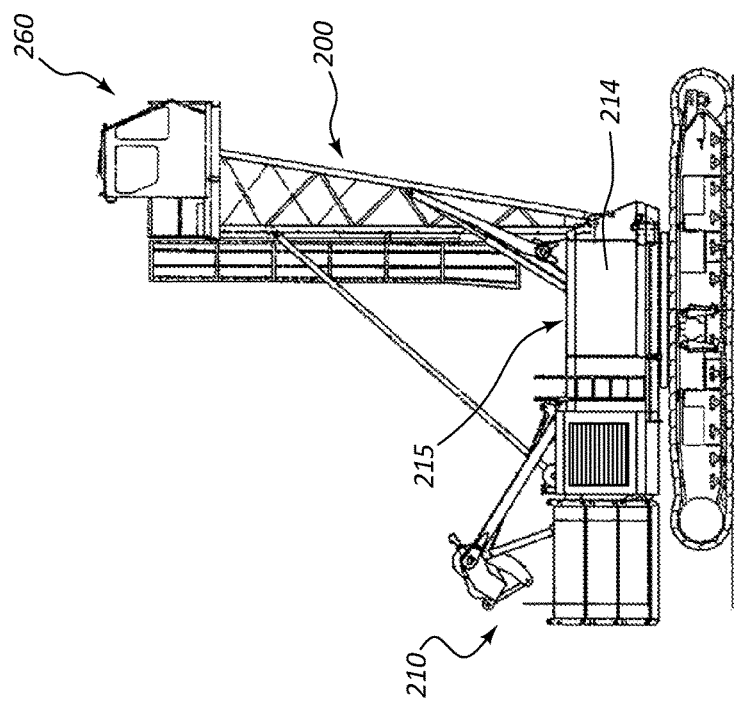
FIG. 14 is a right side elevation view of another embodiment of a mobile lift crane that includes an embodiment of an operator's cab and cab support assembly coupled to an elevation structure.

FIGS. 14 and 15 illustrate another embodiment of a crane 210 in which a cab support assembly as described above includes an elevation structure 200 that couples the cab support (not illustrated, but corresponding to cab support 10) to a frame or rotating bed 214. The elevation structure 200 raises the cab support assembly above a top or top portion 215 of the frame or rotating bed 214. The cab support assembly provides the ability for the cab 260 to tilt downwards, as described above, along with the other features and elements as described above. In some embodiments, the elevation structure 200 is sufficiently large as to require it to be removed, along with the cab, before transportation. In those cases, the cab 260 may rotate to a stowed position relative to the elevation structure 200 as generally described above with respect to the rotating bed. Alternatively, in some embodiments the cab 260 is disassembled from the elevation structure 200 altogether and shipped separately.

Briefly, with the structure and operation described, FIGS. 5-7 illustrate the cab support 110 in its operating position 80. In FIGS. 5 and 6, the actuation device 140 is in its first position 170, with the front portion 123 of the cab support mounting frame in a first position that corresponds with the plane 172. While not illustrated, it is possible for the cab support 110 to be in its operating position 80 with the actuation device 140 in its second position 174, i.e., with the cab tilted downward.

Figure 10:
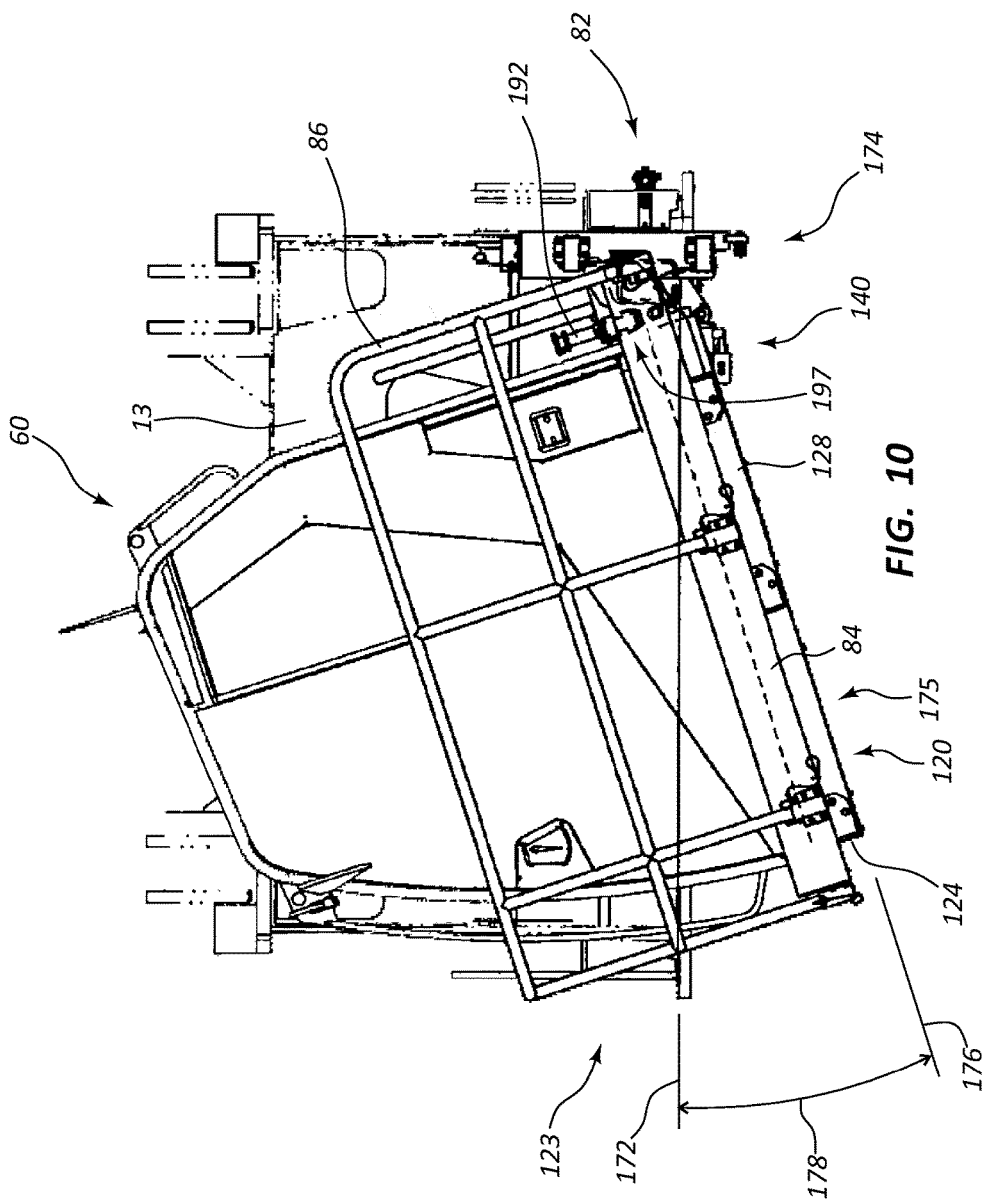
FIG. 10 is a front elevation view of the operator's cab of FIG. 2 with the operator's cab shown in the stowed position with several other elements removed for clarity.
Figure 11:
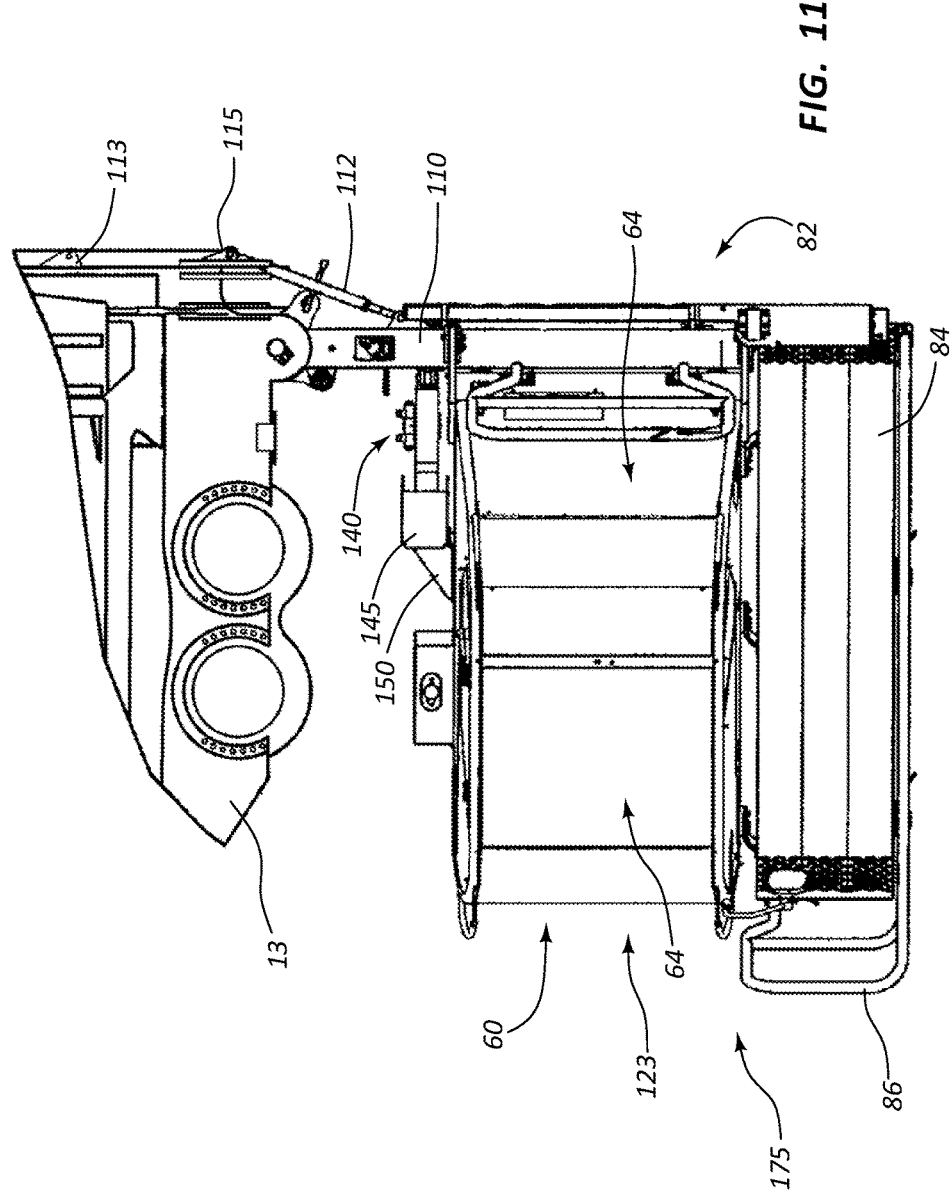
FIG. 11 is a top elevation view of the operator's cab of FIG. 2 with the operator's cab shown in the stowed position with several other elements removed for clarity.
Figure 12:
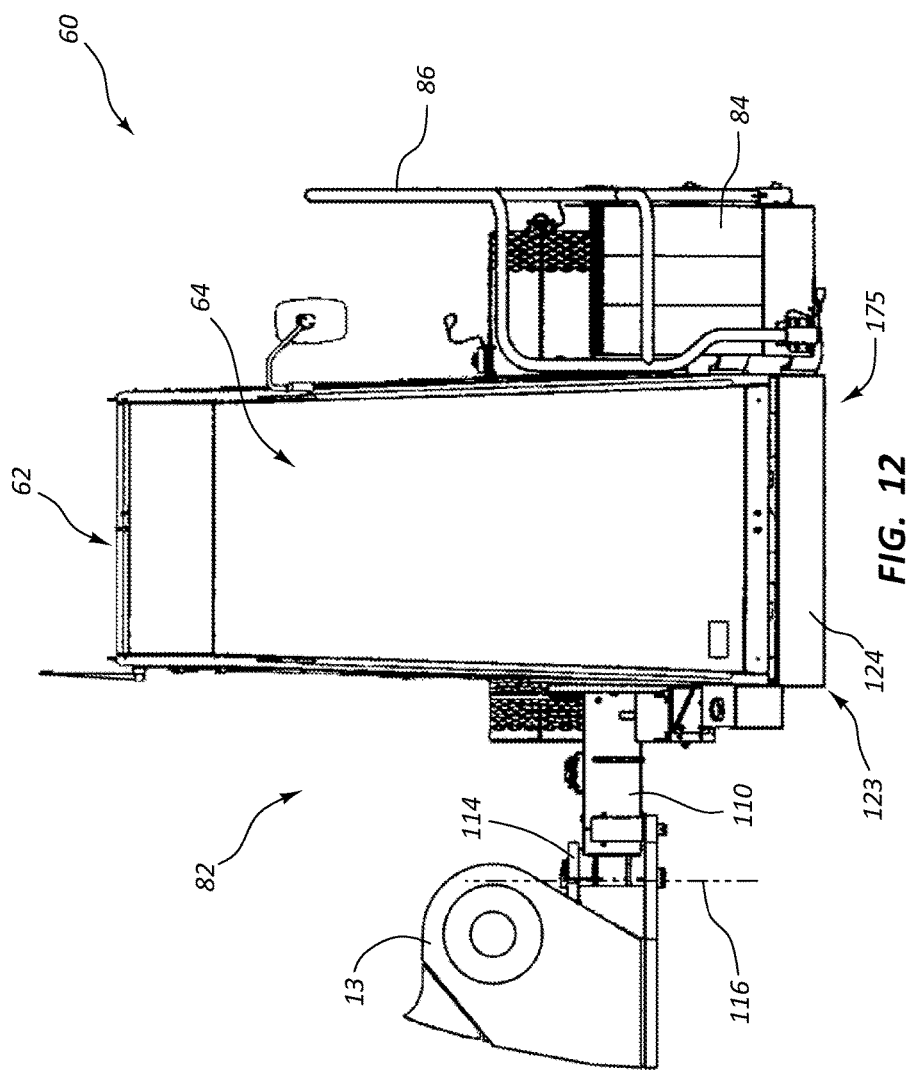
FIG. 12 is a right side elevation view of the operator's cab of FIG. 2 with the operator's cab shown in the stowed position with several other elements removed for clarity.

In FIGS. 10-12, the cab support 110 is in its stowed position 82. While there is no requirement to tilt the cab 60 downward when the cab support 110 is in the stowed position, it is possible and preferable to do so in those instances it is necessary to meet any traveling restrictions. Thus, in the stowed position 82 illustrated, the actuation device 140 is in its second position 174, which causes the front portion 123 to be in its second position.

Figure 13:
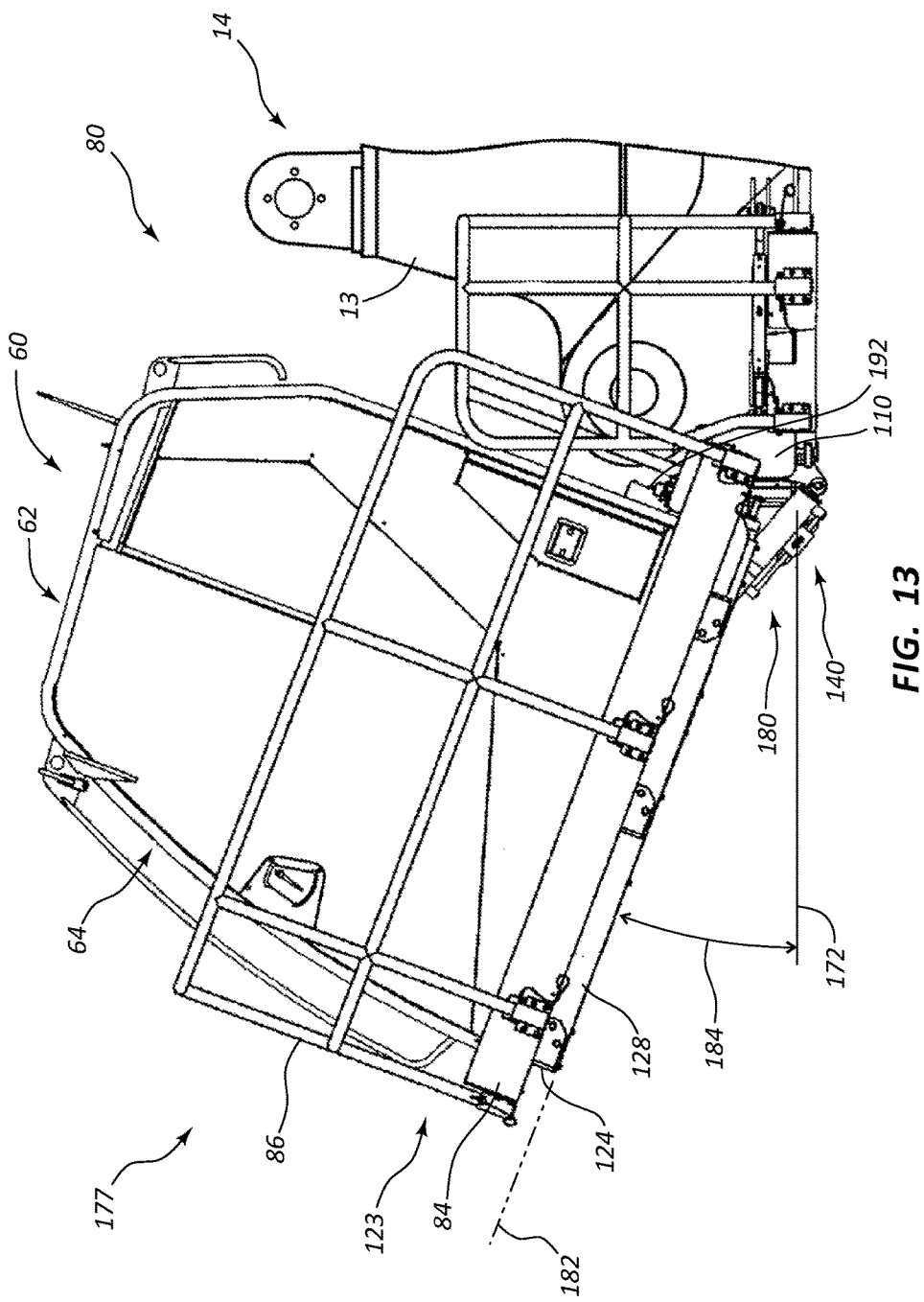
FIG. 13 is a left side elevation view of the operator's cab of FIG. 2 with the operator's cab shown in the operating position and tilted upwards with the cab support mounting frame in a third position with several other elements removed for clarity.

FIG. 13 illustrates the cab support 110 in its operating position and the actuation device 140 in its third position 180. Consequently, the front portion 123 of the cab support mounting frame 120 is in its third position that corresponds with the plane 182.

In addition to the structure and operations described above, a method of moving an operator's cab 60 of a mobile lift crane 10 from an operating position 80 to a stowed position 82 include rotating the cab support 110 around an axis 116 defined by the pivotable coupling 114 from the operating position 80 in which the cab support 110 is at least substantially parallel to a front portion 13 of the rotating bed 14 to the stowed position 82 in which the cab support 110 is substantially perpendicular to the front portion 13 of the rotating bed 14. The method further includes operating the actuation device 140 to lower the front portion 123 of the cab support mounting frame 120 from a first position 170 to a second position 176 that is lower than the first position 170.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A cab support assembly for a construction machine comprising:
   a) a frame mounted on a carbody of said construction machine;
   b) movable ground engaging members mounted on said carbody to allow said construction machine to move over the ground;
   c) an operator's cab;
   d) a cab support coupled to said frame of said construction machine;
   e) a cab support mounting frame pivotably coupled to said cab support, said operator's cab being mounted to said cab support mounting frame; and,
   f) an actuation device coupled to said cab support and to said cab support mounting frame, said actuation device including a first actuation device position in which said cab support mounting frame is in a first position in which said cab support mounting frame defines a first plane, and at least a second actuation device position in which said cab support mounting frame is in a second position such that said cab support mounting frame defines a second plane that intersects said first plane at a first angle, wherein said actuation device is operable to move said operator's cab relative to said frame of said construction machine;
   g) an actuation device mounting bracket coupled to said cab support mounting frame, said actuation device mounting bracket including a bearing surface that defines a bearing plane that is substantially perpendicular to said cab support mounting frame and a link connection that is coupled to said second end of said actuation device; and,
   h) an actuation device link including a first end that is pivotably coupled to said second end of said actuation device, said actuation device link including a second end that is spaced apart from said first end, said second end of said actuation device link being pivotably connected to said link connection.

2. The cab support assembly of claim 1, wherein said construction machine is a mobile lift crane and said frame of said construction machine is a rotating bed rotatably coupled to said carbody.

3. The cab support assembly of claim 1, wherein said actuation device includes at least a third actuation device position in which said cab support mounting frame is in a third position such that said cab support mounting frame defines a third plane that intersects said first plane at a second angle rotated away from the first plane in a direction opposite to the first angle.

4. The cab support assembly of claim 1, wherein said cab support is coupled to said frame of said construction machine at a pivotable coupling, said pivotable coupling defining an axis around which said cab support rotates from an operating position to at least a stowed position.

5. The cab support assembly of claim 1, wherein said cab support mounting frame includes at least a rear member, a front member spaced apart from said rear member, a first side member, and a second side member spaced apart from said first side member, wherein each of said first side member and said second side member connect said rear member with said front member, and wherein said rear member of said cab support mounting frame is pivotably coupled to said cab support.

6. The cab support assembly of claim 5, wherein said cab support is at least one of substantially parallel to a front portion of said frame of said construction machine when said cab support is in said operating position and substantially perpendicular to said front portion of said frame of said construction machine when said cab support is in said stowed position.

7. The cab support assembly of claim 1, further comprising a locking mechanism that includes a locked position that prevents said actuating device from pivoting said cab support mounting frame to said second position and an unlocked position that allows said actuating device to pivot said cab support mounting frame to said second position.

8. The cab support assembly of claim 1, wherein said actuation device includes a first end pivotably connected to said cab support and a second end spaced apart from said first end, said second end of said actuation device being pivotably connected to said cab support mounting frame.

9. The cab support assembly of claim 1, wherein said actuation device is configured to urge said actuation device link against said bearing surface when said actuation device moves from said first position to at least said third position.

10. The cab support assembly of claim 1, wherein said second end of said actuation device is configured to pivot around said first end of said actuation device link and said second end of said actuation device link is configured to pivot around said link connection when said actuation device moves from said first position to said second position and said locking mechanism is in said locked position.

11. The cab support assembly of claim 1, wherein said actuation device comprises a hydraulic cylinder.

12. The cab support assembly of claim 1, further comprising an elevation structure configured to couple said cab support to said frame of said construction machine, said elevation structure configured to raise said cab support assembly above a top of said frame of said construction machine.

13. The cab support assembly of claim 1, wherein said cab support is coupled to a front portion of said frame of said construction machine.

14. A mobile lift crane that includes an operator's cab having an operating position and a stowed position that is rotated and tilted downward relative to said operating position, said mobile lift crane comprising:
   a) a carbody;
   b) movable ground engaging members mounted on said carbody that raise said carbody off the ground and allow said crane to move over the ground;
   c) a rotating bed rotatably coupled to said carbody;
   d) a cab support pivotably coupled to said rotating bed at a pivotable coupling, said pivotable coupling defining an axis around which said cab support rotates from said operating position to at least said stowed position;

e) a cab support mounting frame pivotably coupled to said cab support, said operator's cab being mounted to said cab support mounting frame, said cab support mounting frame having a rear portion and a front portion spaced apart from said rear portion; and, f) an actuation device coupled to said cab support and to said cab support mounting frame, said actuation device including a first actuation device position in which said front portion of said cab support mounting frame is in a first position, and at least a second actuation device position in which said front portion is in a second position that is lower than said first position wherein said actuation device is operable to move said operator's cab relative to said rotating bed of said mobile lift crane, g) an actuation device mounting bracket coupled to said cab support mounting frame, said actuation device mounting bracket including a bearing surface that defines a bearing plane that is substantially perpendicular to said cab support mounting frame and a link connection that is coupled to said second end of said actuation device; and, h) an actuation device link including a first end that is pivotably coupled to said second end of said actuation device, said actuation device link including a second end that is spaced apart from said first end, said second end of said actuation device link being pivotably connected to said link connection.

15. The mobile lift crane of claim 14, wherein said cab support is at least one of substantially parallel to a front portion of said rotating bed when said cab support is in said operating position and substantially perpendicular to said front portion of said rotating bed when said cab support is in said stowed position.

16. The mobile lift crane of claim 14, wherein said front portion of said cab support mounting frame is in said second position when said cab support is in said stowed position.

17. The mobile lift crane of claim 14, wherein said actuation device includes at least a third actuation device position in which said front portion of said cab support mounting frame is in a third position that is higher than said first position.

18. The mobile lift crane of claim 14, further comprising a locking mechanism that includes a locked position that prevents said actuating device from pivoting said cab support mounting frame to said second position and an unlocked position that allows said actuating device to pivot said cab support mounting frame to said second position.

19. The mobile lift crane of claim 14, wherein said actuation device includes a first end pivotably connected to said cab support and a second end spaced apart from said first end, said second end of said actuation device being pivotably connected to said cab support mounting frame.

20. The mobile lift crane of claim 14, wherein said actuation device is configured to urge said actuation device link against said bearing surface when said actuation device moves from said first position to at least said third position.

21. The mobile lift crane of claim 14, wherein said second end of said actuation device is configured to pivot around said first end of said actuation device link and said second end of said actuation device link is configured to pivot around said link connection when said actuation device moves from said first position to said section position and said locking mechanism is in said locked position.

22. The mobile lift crane of claim 14, wherein said actuation device comprises a hydraulic cylinder.

23. The mobile lift crane of claim 14, wherein said cab support is coupled to a front portion of said rotating bed.

* * * * *